United States Patent
Strickler et al.

(10) Patent No.: US 8,034,874 B2
(45) Date of Patent: Oct. 11, 2011

(54) MEDICAL DEVICES HAVING POLYMERIC REGIONS THAT CONTAIN FLUOROCARBON-CONTAINING BLOCK COPOLYMERS

(75) Inventors: Frederick H. Strickler, Natick, MA (US); Ronald A. Sahatjian, Lexington, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 622 days.

(21) Appl. No.: 11/285,885

(22) Filed: Nov. 23, 2005

(65) Prior Publication Data

US 2007/0117925 A1   May 24, 2007

(51) Int. Cl.
*C08L 53/00* (2006.01)
*A61F 2/06* (2006.01)
*A61F 2/24* (2006.01)

(52) U.S. Cl. ......... 525/88; 623/1.15; 623/2.1; 623/1.13; 623/1.24

(58) Field of Classification Search .................... 525/88; 623/1.15, 2.1, 1.13, 1.24
See application file for complete search history.

(56) References Cited

U.S. PATENT DOCUMENTS

| | | | | |
|---|---|---|---|---|
| 3,882,193 | A | 5/1975 | Rice et al. | 260/874 |
| 4,335,723 | A * | 6/1982 | Patel | 604/97.02 |
| 5,130,201 | A | 7/1992 | Yoshimura et al. | 428/416 |
| 5,364,354 | A * | 11/1994 | Walker et al. | 604/103.1 |
| 5,733,925 | A | 3/1998 | Kunz et al. | 514/449 |
| 6,228,943 | B1 | 5/2001 | Morikawa et al. | 525/199 |
| 6,545,097 | B2 | 4/2003 | Pinchuk et al. | 525/240 |
| 6,635,717 | B1 | 10/2003 | Kishine et al. | 525/276 |
| 2002/0147282 | A1 * | 10/2002 | Mayes et al. | 525/245 |
| 2003/0236514 | A1 | 12/2003 | Schwarz | 604/890.1 |
| 2004/0175406 | A1 * | 9/2004 | Schwarz | 424/423 |
| 2005/0025802 | A1 * | 2/2005 | Richard et al. | 424/423 |
| 2005/0025803 | A1 | 2/2005 | Richard et al. | 424/423 |
| 2005/0064011 | A1 | 3/2005 | Song et al. | 424/423 |
| 2005/0107531 | A1 * | 5/2005 | Claude | 525/88 |
| 2005/0214379 | A1 | 9/2005 | Mecozzi et al. | 424/490 |
| 2006/0013854 | A1 * | 1/2006 | Strickler et al. | 424/423 |
| 2006/0047095 | A1 * | 3/2006 | Pacetti | 526/242 |
| 2006/0134165 | A1 * | 6/2006 | Pacetti | 424/422 |

FOREIGN PATENT DOCUMENTS

| | | |
|---|---|---|
| EP | 0 885 928 A1 | 12/1998 |
| EP | 1 209 176 A1 | 5/2002 |
| WO | WO9402185 * | 2/1994 |
| WO | WO 00/59963 | 10/2000 |

OTHER PUBLICATIONS

Kraft, Bradley M. et al., "Mechanism of Vinylic and Allylic Carbon-Fluorine Bond Activation of Non-Perfluorinated Olefins Using Cp*$_2$ZrH$_2$," *J. Am. Chem. Soc.* 2002, 124, 8681-8689.

Pyun, Jeffrey et al. "Synthesis of Nanocomposite Organic/Inorganic Hybrid Materials Using Controlled/"Living" Radical Polymerization," *Chem. Mater.*, 13:3436-3448 (2001).

Hvilsted, Soren et al., "Polymers and Block Copolymers of Fluorostyrenes by ATRP," *Polymer Preprints* 2002, 43(2), pp. 26-27.

Shemper, Bianca S., et al., "Syntheses of Fluorinated Copolymers Using Atom Transfer Radical Polymerization (ATRP)," *Polymer Preprints* 2002, 43(2), pp. 169-170.

Salamone, Joseph C., Ed., *Concise Polymeric Materials Encyclopedia*, CRC Press, Boca Raton, pp. 812-814, 1999.

Hudson Tech Files, "Fluorocarbon Elastomers," downloaded from http://rlhudson.com/tech_fluoro.html on May 16, 2005, printed Oct. 27, 2005, 2 pages.

Sperling, L.H., Polymeric Multicomponent Materials, John Wiley & Sons, New York, 1997, pp. 275-278.

* cited by examiner

*Primary Examiner* — Mark Eashoo
*Assistant Examiner* — Liam Heincer
(74) *Attorney, Agent, or Firm* — Mayer & Williams PC; David B. Bonham; Keum J. Park

(57) ABSTRACT

In one aspect, the present invention provides implantable or insertable medical devices, which contain at least one polymeric region. The polymeric region contains at least one fluorocarbon-containing block copolymer, which, in turn, contains (a) at least one fluorocarbon-containing, low glass transition temperature (low $T_g$) copolymer chain and (b) at least one glass transition temperature (high $T_g$) polymer chain.

15 Claims, No Drawings

MEDICAL DEVICES HAVING POLYMERIC REGIONS THAT CONTAIN FLUOROCARBON-CONTAINING BLOCK COPOLYMERS

FIELD OF THE INVENTION

The present invention relates generally to medical devices, and more particularly to implantable or insertable medical devices which contain polymeric regions.

BACKGROUND OF THE INVENTION

In the past several years, stents have emerged as a prime therapy for atherosclerosis, because they counteract the effects of intimal hyperplasia from balloon injury. Unfortunately, in-stent restenosis can occur as a result of stent injury to the vessel wall. In response, drug eluting stents have been developed, which have a polymeric coating that releases a drug at a rate and for a duration that is effective to counteract the effects of in-stent restenosis. Examples of such devices include drug eluting coronary stents, which are commercially available from Boston Scientific Corp. (TAXUS), Johnson & Johnson (CYPHER), and others. The polymeric coating on the stent is in contact with the delivery system (e.g., balloon) on its inner diameter and in contact with the vessel wall on its outer diameter. It is therefore advantageous to optimize the properties of the polymeric coating so as to control the release of drug, to have optimum biocompatibility against the vessel wall, and to be compatible with the surface of the balloon.

Poly(styrene-isobutylene-styrene) triblock copolymers (SIBS), described, for example, in U.S. Pat. No. 6,545,097 to Pinchuk et al., are thermoplastic elastomers in which the poly(isobutylene) mid-block is elastomeric and the styrene end blocks form physical crosslinks. This polymer is used in drug-releasing polymeric coatings for coronary stents. The polymeric coating has good integrity and, being elastomeric, is able to expand as the stent is expanded. SIBS also has excellent biocompatibility, particularly within the vasculature.

SIBS is made by a living cationic polymerization process, which must be conducted at low temperatures and under stringent conditions. If possible, it would be advantageous to manufacture polymers that are analogous to SIBS polymers using less stringent processes, such as such as free radical polymerization.

Furthermore, there are a limited number of monomers that can be polymerized by living cationic polymerization, restricting one's ability to vary the chemical composition of polymers made by this process. Because the chemical and physical characteristics of polymers are strongly influenced by the monomers that are used to form them, it would be advantageous to employ other processes besides living cationic polymerization. For example, the number and chemical variety of the monomers that can be polymerized by free radical processes are considerably broader that those that can be polymerized by cationic methods. The ability to use free radical processes would therefore allow one to tailor the properties of the polymer with greater flexibility as compared to cationic polymerization methods.

SUMMARY OF THE INVENTION

According one aspect, the present invention provides implantable or insertable medical devices that contain at least one polymeric region. The polymeric region contains at least one fluorocarbon-containing block copolymer, which includes (a) at least one fluorocarbon-containing, low glass transition temperature (low $T_g$) copolymer chain and (b) at least one high glass transition temperature (high $T_g$) polymer chain.

In certain embodiments, the medical device further comprises a therapeutic agent disposed within or beneath the polymeric region.

An advantage of the present invention is that polymeric regions may be formed which have relatively low surface energies, and therefore have relatively low surface tack. Low surface energy materials are also known to be associated with good biocompatibility.

Another advantage of the present invention is that copolymers may be employed, which are formed using free radical polymerization techniques. Due to the relatively wide array of monomers that may be polymerized using such techniques, the composition of the resulting copolymers may vary widely, influencing various chemical and physical properties of the polymeric regions of the invention, such as therapeutic agent release profile, biocompatibility and/or surface tack. For example, the release profile of a therapeutic agent may be controlled by varying the amount and/or type of monomers within the high $T_g$ polymer chain(s) of the copolymer, by varying the amount and/or type of the monomers in the fluorocarbon-containing, low $T_g$ copolymer chain(s) of the copolymer, or both.

These and other aspects, embodiments and advantages of the present invention will become immediately apparent to those of ordinary skill in the art upon review of the Detailed Description and Claims to follow.

DETAILED DESCRIPTION OF THE INVENTION

A more complete understanding of the present invention is available by reference to the following detailed description of numerous aspects and embodiments of the invention. The detailed description of the invention which follows is intended to illustrate but not limit the invention.

As indicated above, according to one aspect of the present invention, implantable or insertable medical devices are provided that contain at least one polymeric region, which contains at least one fluorocarbon-containing block copolymer. The fluorocarbon-containing block copolymer includes (a) at least one fluorocarbon-containing, low glass transition temperature (low $T_g$) copolymer chain and (b) at least one high glass transition temperature (high $T_g$) polymer chain.

Medical devices benefiting from the present invention include a variety of implantable or insertable medical devices, which are implanted or inserted into a subject, for example, for procedural uses or as implants. Examples include catheters (e.g., renal or vascular catheters such as balloon catheters), guide wires, balloons, filters (e.g., vena cava filters, distal protection filters, etc.), stents (including coronary artery stents, peripheral vascular stents such as cerebral stents, urethral stents, ureteral stents, biliary stents, tracheal stents, gastrointestinal stents and esophageal stents), stent grafts, vascular grafts, vascular access ports, embolization devices including cerebral aneurysm filler coils (including Guglilmi detachable coils and metal coils), myocardial plugs, pacemaker leads, left ventricular assist hearts and pumps, total artificial hearts, heart valves, vascular valves, tissue bulking devices, tissue engineering scaffolds for cartilage, bone, skin and other in vivo tissue regeneration, sutures, suture anchors, anastomosis clips and rings, tissue staples and ligating clips at surgical sites, cannulae, metal wire ligatures, orthopedic prosthesis such as bone grafts, bone plates, joint prostheses, as well as various other medical devices that are adapted for implantation or insertion into the body.

The medical devices of the present invention include implantable and insertable medical devices that are used for systemic treatment, as well as those that are used for localized treatment, including treatment of any mammalian tissue or organ. Non-limiting examples are tumors; organs including the heart, coronary and peripheral vascular system (referred to overall as "the vasculature"), the urogenital system, including kidneys, bladder, urethra, ureters, prostate, vagina, uterus and ovaries, eyes, lungs, trachea, esophagus, intestines, stomach, brain, liver and pancreas, skeletal muscle, smooth muscle, breast, dermal tissue, cartilage, tooth and bone.

As used herein, "treatment" refers to the prevention of a disease or condition, the reduction or elimination of symptoms associated with a disease or condition, or the substantial or complete elimination of a disease or condition. Preferred subjects (also referred to as "patients") are vertebrate subjects, more preferably mammalian subjects and more preferably human subjects. Specific examples of medical devices for use in conjunction with the present invention include vascular stents, such as coronary stents and cerebral stents, which may deliver a therapeutic agent into the vasculature for the treatment of restenosis.

In some embodiments, the polymeric regions for use in the medical devices of the invention correspond to an entire medical device. In other embodiments, the polymeric regions correspond to one or more portions of a medical device. For instance, the polymeric regions can be in the form of a component of a medical device, in the form of one or more fibers which are incorporated into a medical device, in the form of one or more polymeric layers formed over all or only a portion of an underlying medical device substrate, and so forth. Layers can be provided over an underlying substrate at a variety of locations, and in a variety of shapes (e.g., in desired patterns, for instance, using appropriate masking techniques, such as lithographic techniques). Materials for use as underlying medical device substrates include ceramic, metallic and polymeric substrates. The substrate material can also be a carbon- or silicon-based material, among others. As used herein a "layer" of a given material is a region of that material whose thickness is small compared to both its length and width. As used herein a layer need not be planar, for example, taking on the contours of an underlying substrate. Layers can be discontinuous (e.g., patterned). Terms such as "film," "layer" and "coating" may be used interchangeably herein.

As used herein, a "polymeric region" is a region that contains one or more polymers, typically 50 wt % to 75 wt % to 90 wt % to 95 wt % polymer, or more.

As used herein, "polymers" are molecules that contain multiple copies of one or more types of constitutional units, commonly referred to as monomers. The number of monomers/constitutional units within a given polymer may vary widely, ranging, for example, from 5 to 10 to 25 to 50 to 100 to 1000 to 10,000 or more constitutional units.

Polymers for use in the polymeric regions of the present invention can have a variety of architectures, including cyclic, linear and branched architectures. Branched architectures include star-shaped architectures (e.g., architectures in which three or more chains emanate from a single branch point), comb architectures (e.g., architectures having a main chain and a plurality of side chains, such as graft polymers) and dendritic architectures (e.g., arborescent and hyperbranched polymers), among others.

Polymers containing a single type of monomer are called homopolymers, whereas polymers containing two or more types of monomers are referred to as copolymers. The two or more types of monomers within a given copolymer may be present in any of a variety of distributions including random, statistical, gradient and periodic (e.g., alternating) distributions, among others.

One particular type of copolymer is a "block copolymer," which is a copolymer that contains two or more polymer chains of different composition, which chains may be selected from homopolymer chains and copolymer chains (e.g., random, statistical, gradient, and periodic copolymer chains). A specific example of a block copolymer is SIBS, which includes one homopolymer chain of polyisobutylene and two homopolymer chains of polystyrene attached at each end of the polyisobutylene (excluding initiators, etc.). Another example of a block copolymer is SEBS (described in more detail below), which includes a copolymer chain of poly(ethylene-co-butylene) with two homopolymer chains of polystyrene attached at each end.

As indicated above, in one aspect, the present invention provides implantable or insertable medical devices that contain one or more polymeric regions. These polymeric regions, in turn, contain one or more fluorocarbon-containing block copolymers that include: (a) at least one fluorocarbon-containing, low $T_g$ copolymer chain and (b) at least one high $T_g$ polymer chain.

Low $T_g$ polymer chains are polymer chains that display a $T_g$ that is below ambient temperature, more typically 20° C. to 10° C. to 0° C. to −25° C. or less. "Ambient temperature" is 25° C.-45° C., more typically body temperature (e.g., 35° C.-40° C.). Conversely, high $T_g$ polymer chains are those that display a glass transition temperature that is above ambient temperature, more typically 50° C. to 75° C. to 100° C. or more. $T_g$ can be measured by any of a number of techniques including differential scanning calorimetry (DSC), dynamic mechanical analysis (DMA), or dielectric analysis (DEA). Low $T_g$ polymer chains are generally soft and elastomeric at ambient temperature, whereas high $T_g$ polymer chains are generally hard at ambient temperature.

A fluorocarbon-containing copolymer chain is a copolymer chain that contains two or more monomers, at least one of which contains one or more C—F bonds. Examples of fluorocarbon-containing, low $T_g$ copolymer chains include copolymer chains containing one or more of the following monomers: fluorinated alkenes such as vinylidene fluoride, hexafluoropropylene and tetrafluoroethylene, fluorinated vinyl ethers such as perfluoromethylvinyl ether and perfluoropropoxypropylvinyl ether, among others. In some cases, the fluorocarbon-containing copolymer chain may further comprise a monomer that does not contain a C—F bond. Specific examples include alkene monomers, such as ethylene, propylene, as well as other α-olefins. Polyethylene may be polymerized, for example, by free-radical techniques, whereas other α-olefins may be polymerized by Ziegler-Natta or metallocene catalysts.

Some examples of fluorocarbon-containing, low $T_g$ copolymer chains include: copolymer chains containing vinylidene fluoride and hexafluoropropylene, copolymer chains containing vinylidene fluoride, hexafluoropropylene and tetrafluoroethylene, copolymer chains containing vinylidene fluoride, tetrafluoroethylene and fluorinated vinyl ether, copolymer chains containing tetrafluoroethylene and ethylene, copolymer chains containing tetrafluoroethylene, ethylene and vinylidene fluoride, copolymer chains containing tetrafluoroethylene and perfluoromethylvinyl ether, copolymer chains containing tetrafluoroethylene and perfluoropropoxypropylvinyl ether, and fluoroacryate copolymer chains such as hexafluoro-2-methylisopropyl acrylate polymer chains (available from SynQuest Fluorochemicals, Alachua, Fla., USA), among others.

Examples of high $T_g$ chains include chains containing one or more of the following monomers: vinyl aromatic monomers, acrylate monomers, methacrylate monomers, vinyl alcohol, vinyl ester monomers, vinyl amine monomers, vinyl halide monomers, and alkyl vinyl ether monomers, among others.

Specific examples of high $T_g$ polymer chains include those that contain one or more monomers selected from the following (listed along with a published $T_g$ for the homopolymer): (1) vinyl aromatic monomers including (a) unsubstituted vinyl aromatics, such as styrene ($T_g$ 100° C.) and 2-vinyl naphthalene ($T_g$ 151° C.), (b) vinyl substituted aromatic monomers such as a-methyl styrene, and (c) ring-substituted vinyl aromatic monomers including ring-alkylated vinyl aromatics such as 3-methylstyrene ($T_g$ 97° C.), 4-methylstyrene ($T_g$ 97° C.), 2,4-dimethylstyrene ($T_g$ 112° C.), 2,5-dimethylstyrene ($T_g$ 143° C.), 3,5-dimethylstyrene ($T_g$ 104° C.), 2,4,6-trimethylstyrene ($T_g$ 162° C.), and 4-tert-butylstyrene ($T_g$ 127° C.), ring-alkoxylated vinyl aromatics, such as 4-methoxystyrene ($T_g$ 113° C.) and 4-ethoxystyrene ($T_g$ 86° C.), ring-halogenated vinyl aromatics such as 2-chlorostyrene ($T_g$ 119° C.), 3-chlorostyrene ($T_g$ 90° C.), 4-chlorostyrene ($T_g$ 110° C.), 2,6-dichlorostyrene ($T_g$ 167° C.), 4-bromostyrene ($T_g$ 118° C.), 4-fluorostyrene ($T_g$ 95° C.), 1,2,2-triflurostyrene, pentafluorostyrene, and 2,6-difluorostyrene (SynQuest Fluorochemicals), ring-hydroxylated vinyl aromatics such as 4-hydroxystyrene (if desired, a monomer with a protected hydroxyl group, such as p-[t-butyldimethylsiloxy]styrene, may be polymerized and de-protected), and ring-ester-substituted vinyl aromatics such as 4-acetoxystyrene ($T_g$ 116° C.); (2) other vinyl monomers including (a) vinyl esters such as vinyl benzoate ($T_g$ 71° C.), vinyl 4-tert-butyl benzoate ($T_g$ 101° C.), vinyl cyclohexanoate ($T_g$ 76° C.), vinyl pivalate ($T_g$ 86° C.), vinyl trifluoroacetate ($T_g$ 46° C.), vinyl butyral ($T_g$ 49° C.), (b) vinyl amines such as 2-vinyl pyridine ($T_g$ 104° C.), 4-vinyl pyridine ($T_g$ 142° C.), and vinyl carbazole ($T_g$ 227° C.), (c) vinyl halides such as vinyl chloride ($T_g$ 81° C.); (d) alkyl vinyl ethers such as tert-butyl vinyl ether ($T_g$ 88° C.) and cyclohexyl vinyl ether ($T_g$ 81° C.), and (e) other vinyl compounds such as 1-vinyl-2-pyrrolidone, and vinyl ferrocene ($T_g$ 189° C.); (3) other aromatic monomers including acenaphthalene ($T_g$ 214° C.) and indene ($T_g$ 85° C.); (4) methacrylic monomers including (a) methacrylic acid anhydride ($T_g$ 159° C.), (b) methacrylic acid esters (methacrylates) including (i) alkyl methacrylates such as methyl methacrylate ($T_g$ 105-120° C.), ethyl methacrylate ($T_g$ 65° C.), isopropyl methacrylate ($T_g$ 81° C.), isobutyl methacrylate ($T_g$ 53° C.), t-butyl methacrylate ($T_g$ 118° C.) and cyclohexyl methacrylate ($T_g$ 92° C.), (ii) aromatic methacrylates such as phenyl methacrylate ($T_g$ 110° C.) and including aromatic alkyl methacrylates such as benzyl methacrylate ($T_g$ 54° C.), (iii) hydroxyalkyl methacrylates such as 2-hydroxyethyl methacrylate ($T_g$ 57° C.) and 2-hydroxypropyl methacrylate ($T_g$ 76° C.), (iv) additional methacrylates including isobornyl methacrylate ($T_g$ 110° C.) and trimethylsilyl methacrylate ($T_g$ 68° C.), and (c) other methacrylic-acid derivatives including methacrylonitrile ($T_g$ 120° C.); and (5) acrylic monomers including (a) certain acrylic acid esters such as tert-butyl acrylate ($T_g$ 43-107° C.), hexyl acrylate ($T_g$ 57° C.) and isobornyl acrylate ($T_g$ 94° C.); and (b) other acrylic-acid derivatives including acrylonitrile ($T_g$ 125° C.).

Specific examples of high $T_g$ polymer chains further include POSS containing high $T_g$ chains, for example, methacrylate-functionalized POSS materials available from Hybrid Plastics, Hattiesburg, Miss., USA.

As indicated above, architectures may vary widely for the polymers that are used in the medical devices of the present invention. A few exemplary architectures, among many other possibilities, for the fluorocarbon-containing block copolymers include (a) block copolymers having alternating chains of the type $(HL)_m$, $L(HL)_m$ and $H(LH)_m$ where "L" is the fluorocarbon-containing, low $T_g$ polymer chain, "H" is the high $T_g$ polymer chain, and m is a positive whole number of 1 or more, and (b) block copolymers having multi-arm geometries such as $X(LH)_n$, and $X(HL)_n$, where n is a positive whole number of 2 or more, and X is a hub species (e.g., an initiator molecule residue, a residue of a molecule to which preformed polymer chains are attached, etc.). Other examples of block copolymers include comb-shaped copolymers having an H chain backbone and multiple L side chains, as well as comb-shaped copolymers having an L chain backbone and multiple H side chains. In addition to the hub species mentioned above, copolymers for use in the invention may contain a variety of other non-polymer-chain species, which are commonly present in copolymers, including capping molecule residues, and linking residues, among others.

Block copolymers that have both low and high $T_g$ polymer chains (e.g., diblock copolymers having low and high $T_g$ chains, triblock copolymers having a low $T_g$ central chain or "midblock" and one or more high $T_g$ end chains or "endblocks", triblock copolymers having a high $T_g$ midblock and one or more low $T_g$ endblocks, comb copolymers having a low $T_g$ main chain and multiple high $T_g$ side chains, comb copolymers having a high $T_g$ main chain and multiple low $T_g$ side chains, and so forth) commonly contain distinct low and high $T_g$ polymer phases. Like SIBS and other block copolymers, such copolymers are typically thermoplastic elastomers and have various desirable properties, including high strength and elasticity, melt processability, and so forth.

Moreover, copolymers with fluorocarbon-containing polymer chains generally have low surface energies. Surface energy is also related to hydrophilicity/hydrophobicity, with low surface energy materials being relatively hydrophobic and high energy materials being relatively hydrophilic. Consequently, the introduction of fluorocarbon-containing polymer chains generally increases hydrophobicity. Such an increase in hydrophobicity will alter the drug release rate.

To the extent that it may be desirable to offset somewhat the low surface energy effects of the fluorine atoms in the block copolymer, relatively hydrophilic polymer chains may be employed in the polymeric regions of the invention. For example, the high $T_g$ chains in the fluorocarbon-containing block copolymers may be relatively hydrophilic, for example, comprising one or more of the following monomers: 2-hydroxymethacrylate, 4-acetoxystyrene, 4-hydroxystyrene and methylmethacrylate, among others. As another example, the fluorocarbon-containing block copolymers may be provided with one or more relatively hydrophilic chains in addition to the high $T_g$ and fluorocarbon-containing, low $T_g$ copolymer chains. Such additional relatively hydrophilic chains may be, for example, homopolymer and/or copolymer chains (e.g., random, statistical, gradient, periodic, etc. chains). As yet another example, one or more relatively hydrophilic chains may be provided in conjunction with an additional polymer that is blended with the block copolymer.

Various polymerization techniques can be used to form the above block copolymers, including anionic and cationic polymerization techniques, although radical polymerization methods are particularly beneficial as noted above. Examples of controlled/"living" radical polymerization processes include metal-catalyzed atom transfer radical polymerization (ATRP) processes, stable free-radical polymerization (SFRP)

processes, nitroxide-mediated processes (NMP), and degenerative transfer (e.g., reversible addition-fragmentation chain transfer (RAFT)) processes, among others. The advantages of using a "living" free radical method for copolymer synthesis include non-stringent reaction conditions, molecular weight control, narrow polydispersities, and the ability to prepare block copolymers by the sequential activation of a dormant chain end in the presence of different monomers. These methods are well-detailed in the literature and are described, for example, in an article by Pyun and Matyjaszewski, "Synthesis of Nanocomposite Organic/Inorganic Hybrid Materials Using Controlled/"Living" Radical Polymerization," *Chem. Mater.*, 13:3436-3448 (2001).

In addition to living polymerization techniques such as those discussed above, fluorocarbon-containing block copolymers for use in the present invention may also be formed by linking previously formed polymer chains together using appropriate linking chemistries.

As indicated above, polymeric regions for use in the medical devices of the invention may also optionally contain polymers in addition to the above-described fluorocarbon-containing block copolymers. Such additional polymers may be, for example, blended with the fluorocarbon-containing block copolymers. Additional polymers may be provided for various reasons. For instance, as indicated above, additional polymers may be introduced to render the polymeric region more hydrophilic (or more hydrophobic), which may, for example, modulate the release profile of therapeutic agent(s) within or beneath the polymeric region, if present. Additional polymers may also be introduced to affect the mechanical characteristics, tackiness, biostability, biocompatibility, and/or material processability of the polymeric region, among other effects.

Examples of such additional polymers include a variety of homopolymers and copolymers (including alternating, random, statistical, gradient and block copolymers), which may be cyclic, linear or branched (e.g., the polymers may have star, comb or dendritic architecture), which may be natural or synthetic, and which may be thermoplastic or thermosetting. Specific additional polymers may be selected, for example, from the following: polycarboxylic acid polymers and copolymers including polyacrylic acids; acetal polymers and copolymers; acrylate and methacrylate polymers and copolymers (e.g., n-butyl methacrylate); cellulosic polymers and copolymers, including cellulose acetates, cellulose nitrates, cellulose propionates, cellulose acetate butyrates, cellophanes, rayons, rayon triacetates, and cellulose ethers such as carboxymethyl celluloses and hydroxyalkyl celluloses; polyoxymethylene polymers and copolymers; polyimide polymers and copolymers such as polyether block imides and polyether block amides, polyamidimides, polyesterimides, and polyetherimides; polysulfone polymers and copolymers including polyarylsulfones and polyethersulfones; polyamide polymers and copolymers including nylon 6,6, nylon 12, polycaprolactams and polyacrylamides; resins including alkyd resins, phenolic resins, urea resins, melamine resins, epoxy resins, allyl resins and epoxide resins; polycarbonates; polyacrylonitriles; polyvinylpyrrolidones (cross-linked and otherwise); polymers and copolymers of vinyl monomers including polyvinyl alcohols, polyvinyl halides such as polyvinyl chlorides, ethylene-vinyl acetate copolymers (EVA), polyvinylidene chlorides, polyvinyl ethers such as polyvinyl methyl ethers, polystyrenes, styrene-maleic anhydride copolymers, vinyl-aromatic-olefin copolymers, including styrene-butadiene copolymers, styrene-ethylene-butylene copolymers (e.g., a polystyrene-polyethylene/butylene-polystyrene (SEBS) copolymer, available as Kraton® G series polymers), maleic anhydride functionalized SEBS also available from Kraton®, styrene-isoprene copolymers (e.g., polystyrene-polyisoprene-polystyrene), acrylonitrile-styrene copolymers, acrylonitrile-butadiene-styrene copolymers, styrene-butadiene copolymers and styrene-isobutylene copolymers (e.g., polyisobutylene-polystyrene and polystyrene-polyisobutylene-polystyrene block copolymers such as those disclosed in U.S. Pat. No. 6,545,097 to Pinchuk), polyvinyl ketones, polyvinylcarbazoles, and polyvinyl esters such as polyvinyl acetates; polybenzimidazoles; ethylene-methacrylic acid copolymers and ethylene-acrylic acid copolymers, where some of the acid groups can be neutralized with either zinc or sodium ions (commonly known as ionomers); polyalkyl oxide polymers and copolymers including polyethylene oxides (PEO); polyesters including polyethylene terephthalates and aliphatic polyesters such as polymers and copolymers of lactide (which includes lactic acid as well as d-,1- and meso lactide), epsilon-caprolactone, glycolide (including glycolic acid), hydroxybutyrate, hydroxyvalerate, para-dioxanone, trimethylene carbonate (and its alkyl derivatives), 1,4-dioxepan-2-one, 1,5-dioxepan-2-one, and 6,6-dimethyl-1,4-dioxan-2-one (a copolymer of poly(lactic acid) and poly(caprolactone) is one specific example); polyether polymers and copolymers including polyarylethers such as polyphenylene ethers, polyether ketones, polyether ether ketones; polyphenylene sulfides; polyisocyanates; polyolefin polymers and copolymers, including polyalkylenes such as polypropylenes, polyethylenes (low and high density, low and high molecular weight), polybutylenes (such as polybut-1-ene and polyisobutylene), polyolefin elastomers (e.g., santoprene), ethylene propylene diene monomer (EPDM) rubbers, poly-4-methyl-pen-1-enes, ethylene-alpha-olefin copolymers, ethylene-methyl methacrylate copolymers and ethylene-vinyl acetate copolymers; fluorinated polymers and copolymers, including polytetrafluoroethylenes (PTFE), poly(tetrafluoroethylene-co-hexafluoropropene) (FEP), modified ethylene-tetrafluoroethylene copolymers (ETFE), and polyvinylidene fluorides (PVDF); silicone polymers and copolymers; thermoplastic polyurethanes (TPU); elastomers such as elastomeric polyurethanes and polyurethane copolymers (including block and random copolymers that are polyether based, polyester based, polycarbonate based, aliphatic based, aromatic based and mixtures thereof; examples of commercially available polyurethane copolymers include Bionate®, Carbothane®, Tecoflex®, Tecothane®, Tecophilic®, Tecoplast®, Pellethane®, Chronothane® and Chronoflex®); p-xylylene polymers; polyiminocarbonates; copoly(ether-esters) such as polyethylene oxide-polylactic acid copolymers; polyphosphazines; polyalkylene oxalates; polyoxaamides and polyoxaesters (including those containing amines and/or amido groups); polyorthoesters; biopolymers, such as polypeptides, proteins, polysaccharides and fatty acids (and esters thereof), including fibrin, fibrinogen, collagen, elastin, chitosan, gelatin, starch, glycosaminoglycans such as hyaluronic acid; as well as combinations and further copolymers of the above.

As noted above, in some aspects of the invention, the polymeric regions act to control the release of one or more therapeutic agents, in which case the therapeutic agents may be disposed, for example, beneath and/or within the polymeric regions. Such "polymeric release regions" include carrier regions and barrier regions.

By "carrier region" is meant a polymeric release region which further comprises a therapeutic agent and from which the therapeutic agent is released. For example, in some embodiments, the carrier region constitutes the entirety of the medical device (e.g., a carrier region in the form of a stent body). In other embodiments, the carrier region corresponds to only a portion of the device (e.g., a carrier layer overlying a medical device substrate such as a stent body).

By "barrier region" is meant a region which is disposed between a source of therapeutic agent and a site of intended release, and which controls the rate at which therapeutic agent is released. For example, in some embodiments, the medical device consists of a barrier region that surrounds a source of therapeutic agent. In some embodiments, the barrier region is disposed over a source of therapeutic agent, which is in turn disposed over all or a portion of a medical device substrate.

The release profile for a given therapeutic agent is affected by a number of factors, including (a) the amount of therapeutic agent, (b) the attributes of the fluorocarbon-containing block copolymer, for example, the architecture of the copolymer, the molecular weight and monomer composition of the fluorocarbon-containing, low $T_g$ copolymer chain(s), the molecular weight and monomer composition of the high $T_g$ polymer chain(s), etc., (c) the presence of any additional species, including additional polymers, within the polymeric layer, and so forth. The release profile is also affected by the size, number and/or position of the polymeric region(s) within the device. For example, the release profile of polymeric carrier and barrier layers in accordance with the presenting invention can be modified by varying the thicknesses and/or surface areas of the same. Moreover, multiple polymeric regions can be employed to modify the release profile. For example, multiple carrier or barrier layers of the invention, either having the same or different content (e.g., different polymeric and/or therapeutic agent content), can be stacked on top of one another (hence, carrier layers may also act as barrier layers in some embodiments), can be positioned laterally with respect to one another, and so forth.

As a specific example, for tubular devices such as stents (which can comprise, for example, a laser or mechanically cut tube, one or more braided, woven, or knitted strands, etc.), polymeric release layers can be provided on the luminal surfaces, on the abluminal surfaces, on the lateral surfaces between the luminal and abluminal surfaces (including the ends), patterned along the luminal or abluminal length of the devices, and so forth. Moreover, release layers can control the release of the same therapeutic agent or differing therapeutic agents. It is therefore possible, for example, to release the same or different therapeutic agents at different rates from different locations on the medical device. As another specific example, it is possible to provide a tubular medical device (e.g., a vascular stent) having a first release layer which contains or is disposed over a first therapeutic agent (e.g., an antithrombotic agent) at its inner, luminal surface and a second release layer which contains or is disposed over a second therapeutic agent that differs from the first biologically active agent (e.g., an antiproliferative agent) at its outer, abluminal surface (as well as on the ends, if desired).

Medical devices having sustained release profiles are beneficial in some embodiments of the invention. By "sustained release profile" is meant a release profile in which more than 50% of the total release from the medical device that occurs over the course of implantation/insertion in the body occurs subsequent to 1 day of administration (or in some embodiments subsequent to 2, 4, 8, 16, 32, 64, 128 or even more days of administration). Conversely, this means that 50% or less of the total release from the medical device occurs before the device has been implanted/inserted for the same period.

"Therapeutic agents," "drugs," "pharmaceutically active agents," "pharmaceutically active materials," and other related terms may be used interchangeably herein. These terms include genetic therapeutic agents, non-genetic therapeutic agents and cells. Therapeutic agents may be used singly or in combination.

Exemplary non-genetic therapeutic agents for use in conjunction with the present invention include: (a) anti-thrombotic agents such as heparin, heparin derivatives, urokinase, and PPack (dextrophenylalanine proline arginine chloromethylketone); (b) anti-inflammatory agents such as dexamethasone, prednisolone, corticosterone, budesonide, estrogen, sulfasalazine and mesalamine; (c) antineoplastic/antiproliferative/anti-miotic agents such as paclitaxel, 5-fluorouracil, cisplatin, vinblastine, vincristine, epothilones, endostatin, angiostatin, angiopeptin, monoclonal antibodies capable of blocking smooth muscle cell proliferation, and thymidine kinase inhibitors; (d) anesthetic agents such as lidocaine, bupivacaine and ropivacaine; (e) anti-coagulants such as D-Phe-Pro-Arg chloromethyl ketone, an RGD peptide-containing compound, heparin, hirudin, antithrombin compounds, platelet receptor antagonists, anti-thrombin antibodies, anti-platelet receptor antibodies, aspirin, prostaglandin inhibitors, platelet inhibitors and tick antiplatelet peptides; (f) vascular cell growth promoters such as growth factors, transcriptional activators, and translational promoters; (g) vascular cell growth inhibitors such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin; (h) protein kinase and tyrosine kinase inhibitors (e.g., tyrphostins, genistein, quinoxalines); (i) prostacyclin analogs; (j) cholesterol-lowering agents; (k) angiopoietins; (l) antimicrobial agents such as triclosan, cephalosporins, aminoglycosides and nitrofurantoin; (m) cytotoxic agents, cytostatic agents and cell proliferation affectors; (n) vasodilating agents; (o) agents that interfere with endogenous vasoactive mechanisms; (p) inhibitors of leukocyte recruitment, such as monoclonal antibodies; (q) cytokines; (r) hormones; (s) inhibitors of HSP 90 protein (i.e., Heat Shock Protein, which is a molecular chaperone or housekeeping protein and is needed for the stability and function of other client proteins/signal transduction proteins responsible for growth and survival of cells) including geldanamycin, (t) beta-blockers, (u) bARKct inhibitors, (v) phospholamban inhibitors, (w) Serca 2 gene/protein, (x) immune response modifiers including aminoquizolines, for instance, imidazoquinolines such as resiquimod and imiquimod, and (y) human apolioproteins (e.g., AI, AII, AIII, AIV, AV, etc.).

Further exemplary non-genetic therapeutic agents, not necessarily exclusive of those above, include paclitaxel (including particulate forms thereof, for instance, protein-bound paclitaxel particles such as albumin-bound paclitaxel nanoparticles, e.g., ABRAXANE), sirolimus, everolimus, tacrolimus, Epo D, dexamethasone, estradiol, halofuginone, cilostazole, geldanamycin, ABT-578 (Abbott Laboratories), trapidil, liprostin, Actinomcin D, Resten-NG, Ap-17, abciximab, clopidogrel, Ridogrel, beta-blockers, bARKct inhibitors, phospholamban inhibitors, Serca 2 gene/protein, imiquimod, human apolioproteins (e.g., AI-AV), growth factors (e.g., VEGF-2), as well a derivatives of the forgoing, among others.

Exemplary genetic therapeutic agents for use in conjunction with the present invention include anti-sense DNA and RNA as well as DNA coding for the various proteins (as well as the proteins themselves): (a) anti-sense RNA, (b) tRNA or rRNA to replace defective or deficient endogenous molecules, (c) angiogenic and other factors including growth factors such as acidic and basic fibroblast growth factors, vascular endothelial growth factor, endothelial mitogenic growth factors, epidermal growth factor, transforming growth factor α and β, platelet-derived endothelial growth factor, platelet-derived growth factor, tumor necrosis factor α, hepatocyte growth factor and insulin-like growth factor, (d) cell cycle inhibitors including CD inhibitors, and (e) thymidine kinase ("TK") and other agents useful for interfering with cell proliferation. Also of interest is DNA encoding for the family of bone morphogenic proteins ("BMP's"), including BMP-2, BMP-3, BMP-4, BMP-5, BMP-6 (Vgr-1), BMP-7 (OP-1), BMP-8, BMP-9, BMP-10, BMP-11, BMP-12, BMP-13, BMP-14, BMP-15, and BMP-16. Currently preferred BMP's are any of BMP-2, BMP-3, BMP-4, BMP-5, BMP-6 and BMP-7. These dimeric proteins can be provided as homodimers, heterodimers, or combinations thereof, alone or together with other molecules. Alternatively, or in addition, molecules capable of inducing an upstream or downstream effect of a BMP can be provided. Such molecules include any of the "hedgehog" proteins, or the DNA's encoding them.

Vectors for delivery of genetic therapeutic agents include viral vectors such as adenoviruses, gutted adenoviruses, adeno-associated virus, retroviruses, alpha virus (Semliki Forest, Sindbis, etc.), lentiviruses, herpes simplex virus, replication competent viruses (e.g., ONYX-015) and hybrid vectors; and non-viral vectors such as artificial chromosomes and mini-chromosomes, plasmid DNA vectors (e.g., pCOR), cationic polymers (e.g., polyethyleneimine, polyethyleneimine (PEI)), graft copolymers (e.g., polyether-PEI and polyethylene oxide-PEI), neutral polymers PVP, SP1017 (SU-PRATEK), lipids such as cationic lipids, liposomes, lipoplexes, nanoparticles, or microparticles, with and without targeting sequences such as the protein transduction domain (PTD).

Cells for use in conjunction with the present invention include cells of human origin (autologous or allogeneic), including whole bone marrow, bone marrow derived mononuclear cells, progenitor cells (e.g., endothelial progenitor cells), stem cells (e.g., mesenchymal, hematopoietic, neuronal), pluripotent stem cells, fibroblasts, myoblasts, satellite cells, pericytes, cardiomyocytes, skeletal myocytes or macrophage, or from an animal, bacterial or fungal source (xenogeneic), which can be genetically engineered, if desired, to deliver proteins of interest.

Numerous therapeutic agents, not necessarily exclusive of those listed above, have been identified as candidates for vascular treatment regimens, for example, as agents targeting restenosis. Such agents are useful for the practice of the present invention and include one or more of the following: (a) Ca-channel blockers including benzothiazapines such as diltiazem and clentiazem, dihydropyridines such as nifedipine, amlodipine and nicardapine, and phenylalkylamines such as verapamil, (b) serotonin pathway modulators including: 5-HT antagonists such as ketanserin and naftidrofuryl, as well as 5-HT uptake inhibitors such as fluoxetine, (c) cyclic nucleotide pathway agents including phosphodiesterase inhibitors such as cilostazole and dipyridamole, adenylate/Guanylate cyclase stimulants such as forskolin, as well as adenosine analogs, (d) catecholamine modulators including α-antagonists such as prazosin and bunazosine, β-antagonists such as propranolol and α/β-antagonists such as labetalol and carvedilol, (e) endothelin receptor antagonists, (f) nitric oxide donors/releasing molecules including organic nitrates/nitrites such as nitroglycerin, isosorbide dinitrate and amyl nitrite, inorganic nitroso compounds such as sodium nitroprusside, sydnonimines such as molsidomine and linsidomine, nonoates such as diazenium diolates and NO adducts of alkanediamines, S-nitroso compounds including low molecular weight compounds (e.g., S-nitroso derivatives of captopril, glutathione and N-acetyl penicillamine) and high molecular weight compounds (e.g., S-nitroso derivatives of proteins, peptides, oligosaccharides, polysaccharides, synthetic polymers/oligomers and natural polymers/oligomers), as well as C-nitroso-compounds, O-nitroso-compounds, N-nitroso-compounds and L-arginine, (g) Angiotensin Converting Enzyme (ACE) inhibitors such as cilazapril, fosinopril and enalapril, (h) ATII-receptor antagonists such as saralasin and losartin, (i) platelet adhesion inhibitors such as albumin and polyethylene oxide, (j) platelet aggregation inhibitors including cilostazole, aspirin and thienopyridine (ticlopidine, clopidogrel) and GP IIb/IIIa inhibitors such as abciximab, epitifibatide and tirofiban, (k) coagulation pathway modulators including heparinoids such as heparin, low molecular weight heparin, dextran sulfate and β-cyclodextrin tetradecasulfate, thrombin inhibitors such as hirudin, hirulog, PPACK(D-phe-L-propyl-L-arg-chloromethylketone) and argatroban, FXa inhibitors such as antistatin and TAP (tick anticoagulant peptide), Vitamin K inhibitors such as warfarin, as well as activated protein C, (l) cyclooxygenase pathway inhibitors such as aspirin, ibuprofen, flurbiprofen, indomethacin and sulfinpyrazone, (m) natural and synthetic corticosteroids such as dexamethasone, prednisolone, methprednisolone and hydrocortisone, (n) lipoxygenase pathway inhibitors such as nordihydroguairetic acid and caffeic acid, (o) leukotriene receptor antagonists, (p) antagonists of E- and P-selectins, (q) inhibitors of VCAM-1 and ICAM-1 interactions, (r) prostaglandins and analogs thereof including prostaglandins such as PGE 1 and PGI2 and prostacyclin analogs such as ciprostene, epoprostenol, carbacyclin, iloprost and beraprost, (s) macrophage activation preventers including bisphosphonates, (t) HMG-CoA reductase inhibitors such as lovastatin, pravastatin, fluvastatin, simvastatin and cerivastatin, (u) fish oils and omega-3-fatty acids, (v) free-radical scavengers/antioxidants such as probucol, vitamins C and E, ebselen, trans-retinoic acid and SOD mimics, (w) agents affecting various growth factors including FGF pathway agents such as bFGF antibodies and chimeric fusion proteins, PDGF receptor antagonists such as trapidil, IGF pathway agents including somatostatin analogs such as angiopeptin and ocreotide, TGF-β pathway agents such as polyanionic agents (heparin, fucoidin), decorin, and TGF-β antibodies, EGF pathway agents such as EGF antibodies, receptor antagonists and chimeric fusion proteins, TNF-α pathway agents such as thalidomide and analogs thereof, Thromboxane A2 (TXA2) pathway modulators such as sulotroban, vapiprost, dazoxiben and ridogrel, as well as protein tyrosine kinase inhibitors such as tyrphostin, genistein and quinoxaline derivatives, (x) MMP pathway inhibitors such as marimastat, ilomastat and metastat, (y) cell motility inhibitors such as cytochalasin B, (z) antiproliferative/antineoplastic agents including antimetabolites such as purine analogs (e.g., 6-mercaptopurine or cladribine, which is a chlorinated purine nucleoside analog), pyrimidine analogs (e.g., cytarabine and 5-fluorouracil) and methotrexate, nitrogen mustards, alkyl sulfonates, ethylenimines, antibiotics (e.g., daunorubicin, doxorubicin), nitrosoureas, cisplatin, agents affecting microtubule dynamics (e.g., vinblastine, vincristine, colchicine, Epo D, paclitaxel and epothilone), caspase activators, proteasome inhibitors, angiogenesis inhibitors (e.g., endostatin, angiostatin and squalamine), rapamycin, cerivastatin, flavopiridol and suramin, (aa) matrix deposition/organization pathway inhibitors such as halofuginone or other quinazolinone derivatives and tranilast, (bb) endothelialization facilitators such as VEGF and RGD peptide, and (cc) blood rheology modulators such as pentoxifylline.

Numerous additional therapeutic agents useful for the practice of the present invention are also disclosed in U.S. Pat. No. 5,733,925 assigned to NeoRx Corporation, the entire disclosure of which is incorporated by reference.

Where a therapeutic agent is included, a wide range of therapeutic agent loadings can be used in conjunction with the medical devices of the present invention, with the therapeutically effective amount being readily determined by those of ordinary skill in the art and ultimately depending, for example, upon the condition to be treated, the age, sex and condition of the patient, the nature of the therapeutic agent, the nature of the polymeric region(s), and the nature of the medical device, among other factors.

Numerous techniques are available for forming polymeric regions in accordance with the present invention. For example, where the polymeric region is formed from one or more polymers having adequate thermoplastic characteristics, a variety of standard thermoplastic processing techniques may be used to form the polymeric region, including compression molding, injection molding, blow molding, spinning, vacuum forming and calendaring, as well as extrusion into sheets, fibers, rods, tubes and other cross-sectional profiles of various lengths. Using these and other thermoplastic processing techniques, entire devices or portions thereof can be made.

In other embodiments, solvent-based techniques may be used to form the polymeric regions of the present invention. Using these techniques, a polymeric region can be formed by first providing a solution that contains the polymer(s) that will ultimately form the polymeric region and subsequently removing the solvent. The solvent that is ultimately selected will contain one or more solvent species, which are generally selected based on their ability to dissolve the polymer(s) that form the polymeric region, as well as other factors, including drying rate, surface tension, etc. Generally, several solvents will be tested to see which provides polymeric regions having the best characteristics. Preferred solvent-based techniques include, for example, solvent casting techniques, spin coating techniques, web coating techniques, solvent spraying techniques, dipping techniques, techniques involving coating via mechanical suspension including air suspension, ink jet techniques, electrostatic techniques, and combinations of these processes.

In some embodiments of the invention, a polymer containing solution (where solvent-based processing is employed) or polymer melt (where thermoplastic processing is employed) is applied to a substrate to form a polymeric region. For example, the substrate can correspond to all or a portion of an implantable or insertable medical device to which a polymeric region is applied. The substrate can also be, for example, a template, such as a mold, from which the polymeric region is removed after solidification. In other embodiments, for example, extrusion and co-extrusion techniques, one or more polymeric regions may be formed without the aid of a substrate. In a more specific example, an entire stent body is extruded. In another, a polymeric layer is co-extruded along with and underlying stent body. In another, a polymeric layer is provided on an underlying stent body by spraying or extruding a coating layer onto a pre-existing stent body. In yet another more specific example, a stent is cast in a mold.

If it is desired to provide one or more therapeutic agents (and/or any other optional agents) within the polymeric region, so long as these agents are stable under processing conditions, then they can be provided within the polymer containing solution or polymer melt and co-processed along with the polymer(s).

Alternatively, therapeutic and/or other optional agents can be introduced subsequent to the formation of the polymeric region. For instance, in some embodiments, the therapeutic and/or other optional agents are dissolved or dispersed within a solvent, and the resulting solution contacted with a previously formed polymeric region (e.g., using one or more of the application techniques described above, such as dipping, spraying, etc.).

As noted above, barrier regions are provided over therapeutic-agent-containing regions in some embodiments of the invention. In these embodiments, a polymeric barrier region may be formed over a therapeutic-agent-containing region, for example, using one of the solvent based or thermoplastic techniques described above. Alternatively, a previously formed polymeric region can be adhered over a therapeutic agent containing region.

EXAMPLE

Triblock copolymers with a fluorocarbon-containing, low $T_g$ copolymer midblock are prepared using dimethyl-2,6-heptanedioate as a difunctional initiator. This difunctional initiator is used to copolymerize, via free radical polymerization, monounsaturated fluorinated monomers (e.g., a mixture of hexafluoropropylene and vinylidene fluoride) to form a fluorinated macroinitiator. This macroinitiator is then used to polymerize one or more types of mono-unsaturated high $T_g$ monomer (e.g., styrene), via free radical polymerization, thereby forming two high $T_g$ polymer arms for the central fluorocarbon-containing, low $T_g$ copolymer chain and completing the formation of the triblock copolymer. (By convention, such terminology considers the presence of the incorporated difunctional initiator to be insignificant, treating the two fluorinated elastomeric chains on either side of the initiator as a single chain.)

A coating for a medical device is prepared by dissolving the triblock copolymer and an active therapeutic agent (e.g., an anti-restenotic drug, such as paclitaxel) in a solvent that comprises one or more solvent species. The resulting solution is applied to a medical device (e.g., a metallic stent), for example, by spray drying, and the coating is dried to remove excess solvent. The resulting coating forms a conformal coating on the medical device, which contains the polymer and the drug dispersed within the polymer.

Although various embodiments are specifically illustrated and described herein, it will be appreciated that modifications and variations of the present invention are covered by the above teachings and are within the purview of the appended claims without departing from the spirit and intended scope of the invention.

The invention claimed is:

1. An implantable or insertable medical device comprising a polymeric region that comprises a fluorocarbon-containing block copolymer, said fluorocarbon-containing a block copolymer comprising (a) a main chain comprising a fluorocarbon-containing, low $T_g$ copolymer chain and (b) a plurality of side chains comprising high $T_g$ polymer chains wherein:
(i) the low $T_g$ copolymer chain is selected from (a) a copolymer chain comprising vinylidene fluoride and hexafluoropropylene, (b) a copolymer chain comprising vinylidene fluoride, hexafluoropropylene and tetrafluoroethylene, (c) a copolymer chain comprising vinylidene fluoride, tetrafluoroethylene and fluorinated vinyl ether, (d) a copolymer chain comprising tetrafluoroethylene and ethylene, (e) a copolymer chain comprising tetrafluoroethylene, ethylene and vinylidene fluoride, (f) a copolymer chain comprising tetrafluoroethylene and perfluoromethylvinyl ether, and (g) a copolymer chain comprising tetrafluoroethylene and perfluoropropoxypropylvinyl ether; and (ii) the high $T_g$ polymer chain comprises a member selected from a styrenic monomer selected from styrene, α-methyl styrene, ring-alkylated styrenes, ring-alkoxylated styrenes, ring-halogenated styrenes, ring-hydroxylated styrenes, ring-ester-substituted styrenes and combinations of the foregoing.

2. The medical device of claim 1, wherein said fluorocarbon-containing block copolymer comprises a plurality of fluorocarbon-containing, low $T_g$ copolymer chains.

3. The medical device of claim 1, wherein said fluorocarbon-containing, low $T_g$ copolymer chain further comprises an alpha-olefin monomer.

4. The medical device of claim 1, wherein said fluorocarbon-containing, low $T_g$ copolymer chain is selected from an alternating copolymer chain, a random copolymer chain, a statistical copolymer chain, and a gradient copolymer chain.

5. The medical device of claim 1, wherein said fluorocarbon-containing block copolymer comprises a polystyrene chain.

6. The medical device of claim 1, wherein said high $T_g$ polymer chain is selected from a homopolymer chain, an alternating copolymer chain, a random copolymer chain, a statistical copolymer chain and a gradient copolymer chain.

7. The medical device of claim 1, wherein said device comprises a plurality of said polymeric regions.

8. The medical device of claim 1, wherein said polymeric region is a polymeric layer disposed over a substrate.

9. The medical device of claim 1, wherein said polymer region further comprises an additional polymer in addition to said fluorocarbon-containing block copolymer, and wherein said additional polymer is blended with said block copolymer.

10. The medical device of claim 1, wherein said medical device further comprises a therapeutic agent disposed within or beneath said polymeric region.

11. The medical device of claim 10, wherein said polymeric region is a polymeric layer disposed over a substrate.

12. The medical device of claim 11, wherein said therapeutic agent is disposed beneath said polymeric layer.

13. The medical device of claim 11, wherein said therapeutic agent is disposed within said polymeric layer.

14. The medical device of claim 10, wherein said therapeutic agent is selected from anti-thrombotic agents, anti-proliferative agents, anti-inflammatory agents, anti-migratory agents, agents affecting extracellular matrix production and organization, antineoplastic agents, anti-mitotic agents, anesthetic agents, anti-coagulants, vascular cell growth promoters, vascular cell growth inhibitors, cholesterol-lowering agents, vasodilating agents, and agents that interfere with endogenous vasoactive mechanisms.

15. The medical device of claim 1, wherein said medical device is selected from a guide wire, a balloon, a vena cava filter, a catheter, a stent, a stent graft, a vascular graft, a cerebral aneurysm filler coil, a myocardial plug, a heart valve, a vascular valve, and a tissue engineering scaffold.

* * * * *